(12) United States Patent
Hanechak

(10) Patent No.: US 7,843,466 B2
(45) Date of Patent: Nov. 30, 2010

(54) AUTOMATED IMAGE FRAMING

(75) Inventor: Brian D. Hanechak, Waltham, MA (US)

(73) Assignee: Vistaprint Technologies Limited, Hamilton (BM)

(*) Notice: Subject to any disclaimer, the term of this patent is extended or adjusted under 35 U.S.C. 154(b) by 631 days.

(21) Appl. No.: 11/193,085

(22) Filed: Jul. 29, 2005

(65) Prior Publication Data

US 2007/0024908 A1    Feb. 1, 2007

(51) Int. Cl.
G09G 5/00 (2006.01)
G09G 5/10 (2006.01)

(52) U.S. Cl. .................. 345/619; 345/620; 345/629; 345/698

(58) Field of Classification Search .......... 345/620, 345/629, 698
See application file for complete search history.

(56) References Cited

U.S. PATENT DOCUMENTS

| | | | | |
|---|---|---|---|---|
| 5,140,348 A * | 8/1992 | Jamzadeh et al. | ............ | 347/115 |
| 5,600,412 A * | 2/1997 | Connors | ............ | 399/81 |
| 5,732,230 A * | 3/1998 | Cullen et al. | ............ | 715/764 |
| 5,815,645 A * | 9/1998 | Fredlund et al. | ............ | 358/1.18 |
| 6,337,925 B1 * | 1/2002 | Cohen et al. | ............ | 382/199 |
| 6,421,062 B1 * | 7/2002 | Higashio | ............ | 345/634 |
| 6,587,596 B1 * | 7/2003 | Haeberli | ............ | 382/283 |
| 6,950,993 B2 * | 9/2005 | Breinberg | ............ | 715/801 |
| 6,956,587 B1 * | 10/2005 | Anson | ............ | 345/649 |
| 7,092,564 B2 * | 8/2006 | Jia et al. | ............ | 382/162 |
| 7,283,277 B2 * | 10/2007 | Li | ............ | 358/1.18 |
| 7,330,195 B2 * | 2/2008 | Li | ............ | 345/629 |
| 2002/0191861 A1 * | 12/2002 | Cheatle | ............ | 382/282 |
| 2003/0206316 A1 | 11/2003 | Anderson et al. | | |
| 2004/0080670 A1 * | 4/2004 | Cheatle | ............ | 348/441 |
| 2004/0119725 A1 * | 6/2004 | Li | ............ | 345/629 |
| 2004/0119726 A1 * | 6/2004 | Li | ............ | 345/629 |
| 2005/0088452 A1 * | 4/2005 | Hanggie et al. | ............ | 345/581 |
| 2005/0093888 A1 * | 5/2005 | Rao | ............ | 345/629 |
| 2005/0094207 A1 | 5/2005 | Lo et al. | | |
| 2005/0162445 A1 * | 7/2005 | Sheasby et al. | ............ | 345/620 |
| 2006/0045388 A1 * | 3/2006 | Zeineh et al. | ............ | 382/312 |
| 2006/0103667 A1 * | 5/2006 | Amit et al. | ............ | 345/619 |
| 2006/0244765 A1 * | 11/2006 | Isomura et al. | ............ | 345/635 |
| 2006/0245670 A1 * | 11/2006 | Cazier et al. | ............ | 382/298 |
| 2007/0018999 A1 * | 1/2007 | Rai et al. | ............ | 345/619 |
| 2007/0024909 A1 * | 2/2007 | Hanechak | ............ | 358/1.18 |
| 2008/0049976 A1 * | 2/2008 | Isomura et al. | ............ | 382/106 |

OTHER PUBLICATIONS

"Inside Adobe Photoshop 5" Bouton, et al. ISBN: 0-56205-884-3 New Riders Publishing (May 1998) (hereinafter "Photoshop").*

* cited by examiner

*Primary Examiner*—Xiao M Wu
*Assistant Examiner*—David T Welch
(74) *Attorney, Agent, or Firm*—Jessica J. Costa

(57) ABSTRACT

Methods and systems for automatically creating a frame image for a content image are presented, and include retaining in electronic storage one or more master frame component images, automatically cropping at least one of the master frame component images to create a plurality of frame component images including at least a plurality of cropped versions of the master frame component images, and automatically assembling the frame component images into a frame on a display such that the frame appears as a frame image for the content image when the frame component images and content image are displayed together.

27 Claims, 18 Drawing Sheets

AUTOMATED IMAGE FRAMING

FIELD OF THE INVENTION

The present invention relates to systems and methods for the creation of an image framing another image.

BACKGROUND

Many individuals and businesses occasionally have a need for printed materials such as party invitations, announcements of special events, holiday cards, or any number of other items. Rather than settle for off-the-shelf, generic designs, many customers for these types of products wish to personalize the product by incorporating personal images into the product design, such as photographs of family members or other images of particular interest or relevance to the customer.

Some of these individuals and businesses turn to traditional sources such as a local print shop for assistance in preparing customized materials. As an alternative, many people today choose to prepare their own custom designs using a Web-based printing service site, such as VistaPrint.com, that offers users the ability to access the site from the user's home or office and design a personalized product using document design tools and services provided by the site. Printing services Web sites typically provide their customers with the ability to select a desired product template from variety of pre-designed templates, incorporate text and images to create a customized design, and then place an order for production and delivery of a desired quantity of the product.

Some online sites allow a user to incorporate an image into a design template at any aspect ratio, but the image will be displayed in the template without any accompanying frame image. Some users desire their image to appear in a frame and find the absence of a frame to be unattractive. To let users create a design where the user image appears with a frame, some online sites provide templates designed with image containers having the appearance of a frame and specifically intended for the purpose of receiving user images. These types of image containers generally have fixed aspect ratios that cannot be altered by the user, therefore, unless the user's image happens to have the same aspect ratio as the image container into which it is placed, the image will typically have to be cropped so that it completely fills the container to avoid undesirable empty space in the container. If the user image is cropped automatically, the resulting image version may be totally unsatisfactory to the user. If a cropping tool is provided and the user attempts to perform the cropping operation manually, the user may find the process time consuming and may become frustrated if a suitable cropped version of the user image cannot be readily created.

There is, therefore, a need for a flexible electronic image framing system that is not restricted to a predefined, limited set of fixed aspect ratio image containers, but is instead capable of automatically generating frame images around any image regardless of the image aspect ratio.

SUMMARY

The present invention is directed to satisfying the need for automatically created frame images for content images having any aspect ratio.

In accordance with one embodiment of the invention, frame component images are created for a content image by performing cropping and sizing operations on master frame images. The component images are positioned relative to the content image such that the frame component images will appear as a frame image for the content image when the frame component images and content image are displayed together. Minimum proportion and overlap constraints are employed during the component image creation process to control the size and position relationships among the component frame images.

These and other objects, features and advantages of the invention will be better understood with reference to the accompanying drawings, description and claims.

DETAILED DESCRIPTION

Figure 1:
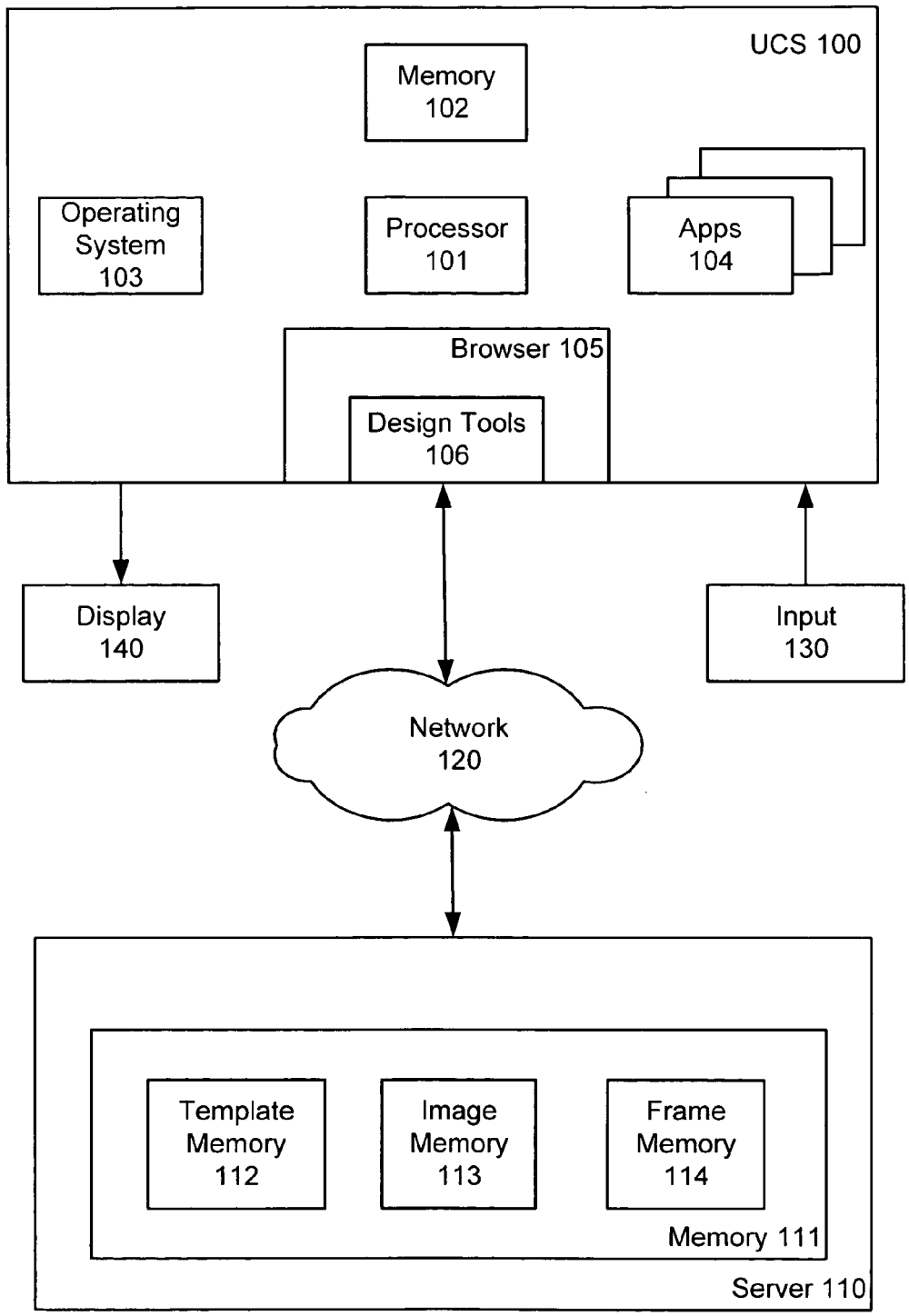
FIG. 1 is a block diagram of a computer system with which the invention may be employed.

Referring to FIG. 1, an exemplary user computer system UCS 100 includes processor 101 and memory 102. Memory 102 represents all UCS 100 components and subsystems that provide data storage, such as RAM, ROM, hard drives, and other such computer readable storage media. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer, or other device. The user views images from UCS 100 on display 140, such as a CRT or LCD screen, and provides inputs to UCS 100 via input devices 130, such as a keyboard and a mouse.

When UCS 100 is operating, an instance of the USC 100 operating system will be running, represented in FIG. 1 by operating system 103. In addition, the user may be running one or more application programs Apps 104. In FIG. 1, UCS 100 is running Web browser 105, such as Internet Explorer from Microsoft Corporation. In the depicted embodiment, design tools 106 is a product design program downloaded to UCS 100 via network 120 from remote server 110, such as downloadable design tools provided by VistaPrint Limited and publicly available at vistaprint.com. Design tools 106 runs in browser 105 and exchanges information and instructions with server 110 during a design session to support the user's preparation of a customized product design in electronic form. When the customer is satisfied with the design of the product, the design can be uploaded to server 110 for storage and, if desired by the user, subsequent production of the desired quantity of the physical product on appropriate printing and post-print processing systems.

While server 110 is shown in F*ig*. 1 as a single block, it will be understood that server 110 could be multiple servers configured to communicate and operate cooperatively to support Web site operations. Server 110 will typically be interacting with many user computer systems, such as UCS 100, simultaneously. Memory 111 represents all components and subsystems that provide server data storage, such as RAM, ROM, disk drives or arrays, and other such computer readable storage media. Template memory 112 represents the portion of memory 111 containing the various layouts, designs, colors, fonts, and other information provided by the service provider to enable the creation and rendering of templates. As used in the embodiment described herein, a layout is an XML description that specifies the size, position and other attributes of all product elements such as text containers, image containers, graphics, z-index values and so forth.

Image memory 113 represents the portion of memory 111 that contains the images provided and used by the service provider in the generation of the product design. In addition, image memory 113 also contains user images uploaded to server 110 by the user of USC 100 and other users.

Frame memory 114 represents the portion of memory 111 that contains the frame elements used to dynamically create appropriately sized frames around images incorporated by a user into a template.

Figure 2:
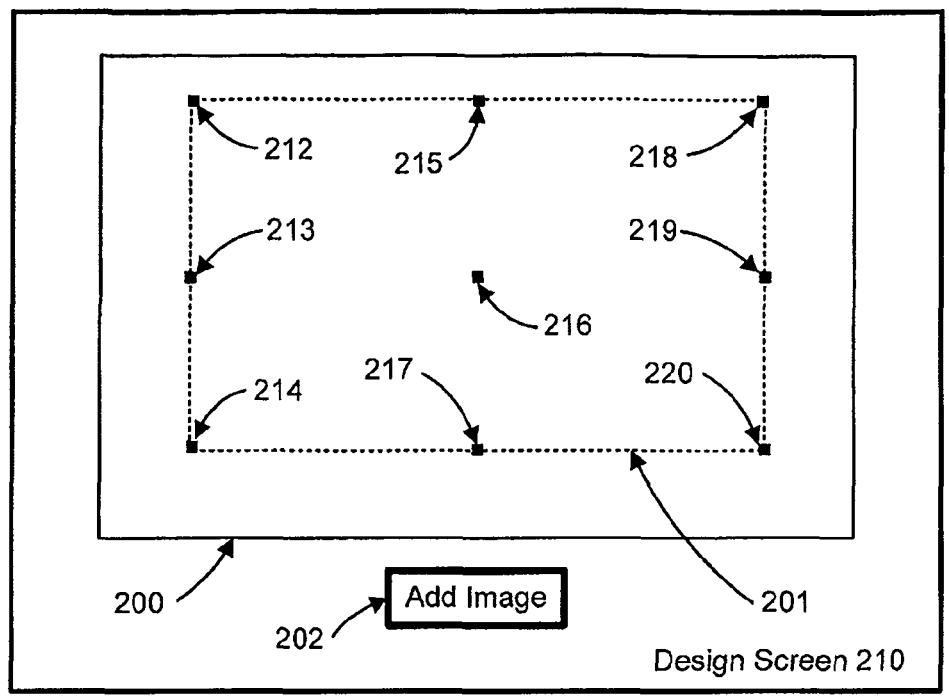
FIG. 2 is a simplified representation of a product design screen presenting a product template designed to accommodate user-provided images.

FIG. 2 is a simplified representation of design screen 210 presented to the user of USC 100 in a browser display window on display 140. In FIG. 2, screen 210 is shown with product template 200 and Add Image button 202. Design display 210 would also typically include various additional elements known in the art, not shown, such as instructional notices, navigational tools allowing the user to request the displaying of one or more other screens, and editing tools, menus, and buttons allowing the user to enter, delete, position and modify text and other content in template 200.

Prior to being presented with template screen 210, the user will typically have viewed and interacted with one or more other preliminary screens, not shown. For example, the user may have reviewed one or more product selection screens displaying thumbnail images of the various types of products offered by the operator of server 110 and, after selecting a product type, the user may then have reviewed one or more template selection screens displaying thumbnail images of various design templates available from server 110 for the selected type of product for user customization. In the example shown in FIG. 2, in response to the user's indication of a desire to prepare a customized product using template 200, the template 200 information has been downloaded from server 110 to UCS 100 and design screen 210 is displayed to the user.

Figure 3:
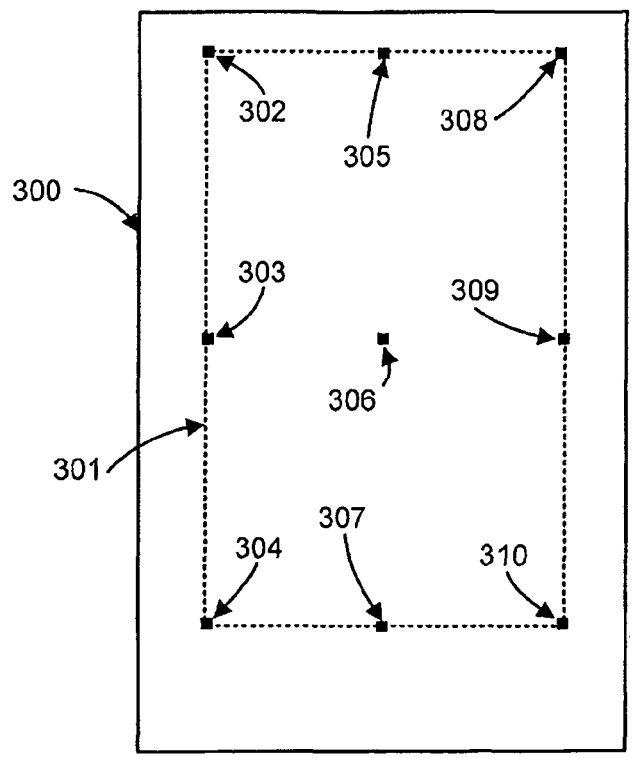
FIG. 3 is a representation of a product design template having a vertical format.

As used herein, a template is a design for a product, or for a portion, page, side, element, section, or component of a product, that a user can customize by adding images and/or text. For example, template 200 could be a design for one side or portion of an invitation, a brochure, a holiday card, or any other type of product being designed by the user of UCS 100. Template 200 was designed by the template designer, typically an employee or agent of the operator of server 110, to accommodate one or more images that a user desires to incorporate into the personalized product. Server 110 will typically provide a wide range of prepared template designs having image areas of varying aspect ratio, position, and relative size from which the user may choose. For example, FIG. 3 shows a representative template 300 for a user desiring a custom product having a vertical format. It will be understood that the invention is not limited to documents that are intended for eventual printing on paper. The invention is also applicable to designs intended for use in electronic form, such as electronic cards and invitations. The invention could as well be readily adapted to a wide range of products that a user may wish to customize, such as items of clothing, product containers, promotional goods, and so forth.

Within template 200 is area 201 that was defined by the designer of the template during the template creation process as a portion of template 200 where user-incorporated content images will be automatically sized and positioned. This area is referred to herein as an "acceptable image area". While an embodiment with a single acceptable image area is discussed herein, it will be understood that a template could, if desired, be designed to contain multiple acceptable image areas.

In conjunction with specifying the size and position of image area 201 within template 200, the template designer will also specify an anchor point that will be used to determine where to position user-identified images within image area 201. In template 200, nine possible anchor points 212-220 are available for selection by the template designer. The points include the four corners, the midpoints of the four sides, and the center of image area 201. Similarly to template 200, template 300 includes acceptable image area 301 and nine possible image anchor points 302-310. For each image area, the template designer, based on aesthetic considerations in light of the size, position and aspect ratio of the image area and other design elements and features of template 200, will choose one of the nine possible locations as the anchor point for that image area. As will be described in more detail below, the defined acceptable image area and the selected anchor point for the image area are used in determining the proper sizing and positioning of user images incorporated into the template. The acceptable image area of the template and the selected anchor point are shown in the figures herein for the purpose of illustration and explanation, but need not necessarily be indicated or displayed to the user while the user is engaged in customizing the template.

Figure 4A:
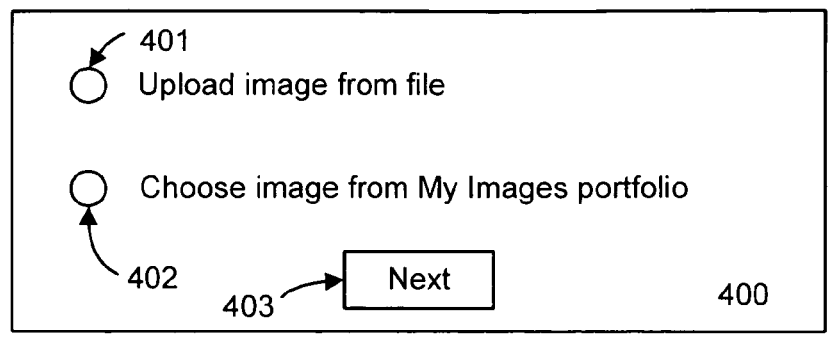
FIGS. 4A and 4B are representations of user image selection screens.

When the user desires to add an image, referred to herein as a content image, to the design, the user will click Add Image button 202. Referring to FIG. 4A, in response to user activation of Add Image button 202, the user will see initial image selection screen 400, containing user-selectable radio buttons 401 and 402. Buttons 401 and 402 allow the user to select whether the user wants to upload an image from UCS 100 or to use an image that the user had earlier uploaded and stored at server 110 in image memory 113. If the user selects button 401 and then clicks next button 403, design tools 106 will display an upload wizard, not shown, allowing the user to enter a specific image file name or browse the USC 100 file system to search for and upload a desired image file. Techniques and tools for identifying and uploading image files from a user system are well known in the art.

If the user has interacted with the service provider in the past and has established a user account at server 110, the user may have already uploaded images for use with other designs or in earlier design sessions. In this case, server 110 will typically retain the user's images in image memory 113 for a period of time for future use by the user. If a user with images already available at server 110 selects button 402 and clicks next 403, design tools 106 will display My Images screen 410 containing thumbnails of the user's previously uploaded and stored images.

Figure 4B:
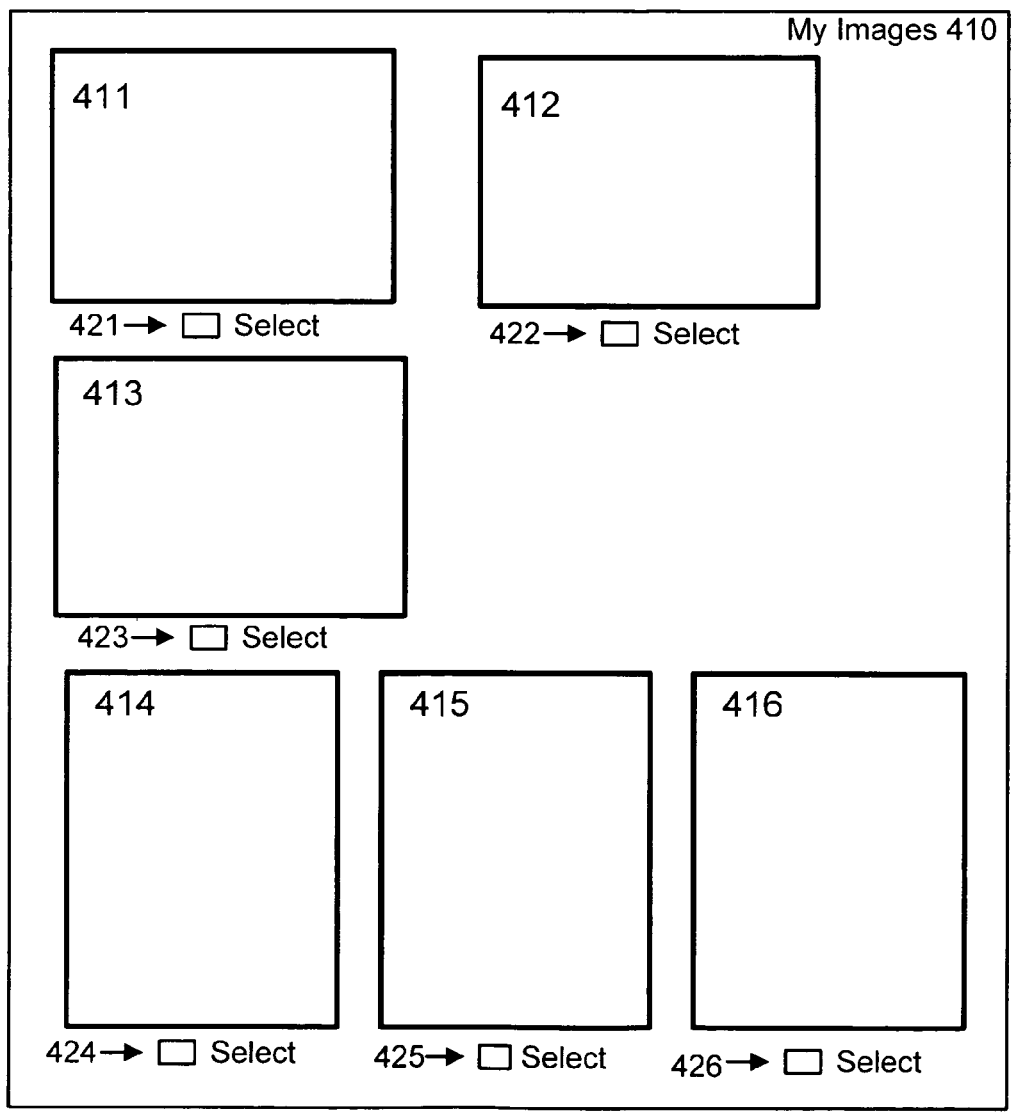

For simplicity of discussion, the following discussion will assume the user selects only images from My Images 410 for incorporation into template 200, but it will be understood that the user could choose to incorporate new images uploaded from USC 100 or incorporate a combination of images from both sources. In the example depicted in FIG. 4, the user's My Images screen displays thumbnails of images 411-416 and associated image selection check boxes 421-426.

The image of the customized design presented to the user on Design Screen 210 will be the composite image resulting from placing the user content image over the underlying template 200 image. Because the template designer cannot know what part of image area 201 will be occupied by the user's content images, the template designer will create template 200 to have design content, such as colors, patterns, or a background image, for all of the area of the template that is beneath acceptable image area 201. This insures that a consistent background will be presented in the user's design regardless of the number, size, and location of the content images in image area 201. Similarly, because any or all of acceptable image area 201 could potentially be filled with one or more content images, the template designer will typically position any designer-entered text or other critical display content in the portion of template 200 that is outside of image area 201.

In the illustrative embodiment described below, when a user identifies an image in My Images 410, the My Images 410 window will close and the displayed design will be updated such that the selected image and all previously identified content images, if any, in image area 201, are resized and simultaneously displayed in image area 201 of template 200. The user can add additional images by again clicking Add Image button 202. It will be understood that, alternatively, the user could be allowed to identify multiple content images while viewing My Images 410 such that multiple content images would be added to image area 201 at one time.

Figure 14:
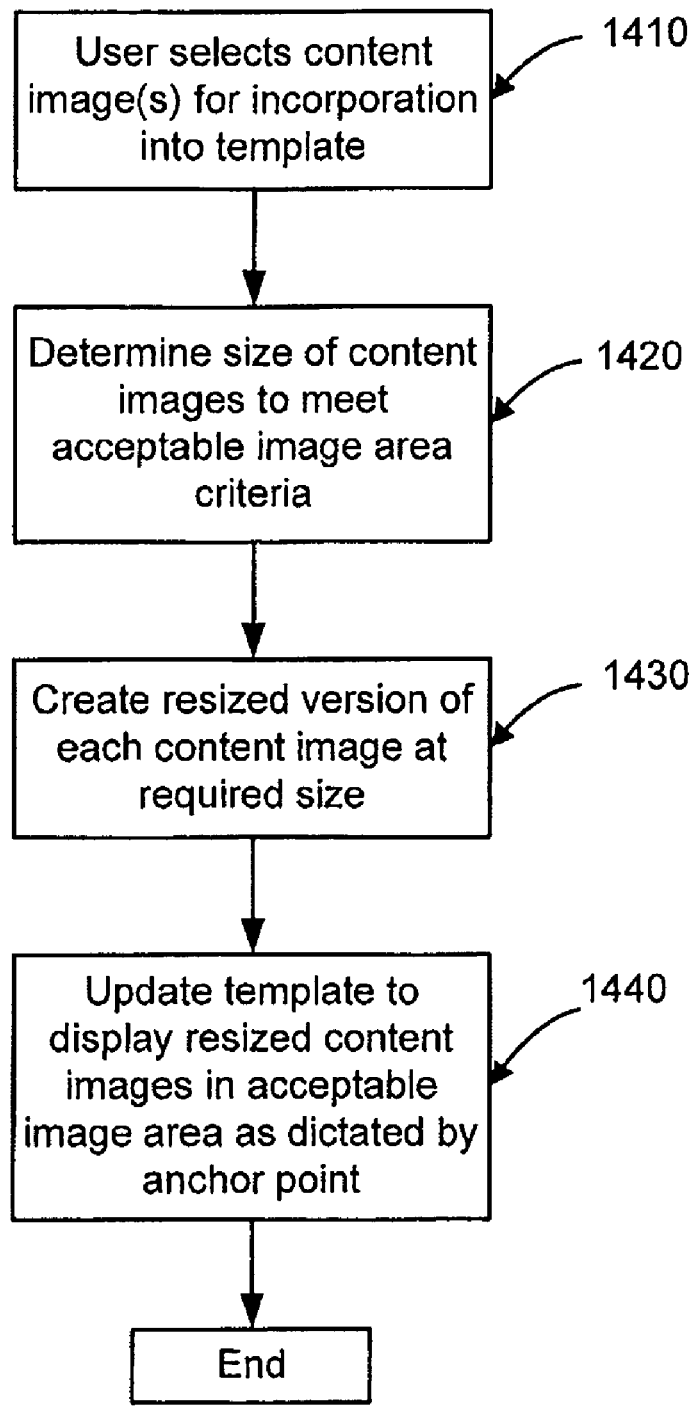
FIG. 14 is a flow chart of an illustrative image incorporation process.

Referring to FIG. 14, an exemplary embodiment of a process for incorporating images into an acceptable image area will be discussed. At step 1410, the user selects a content image that the user desires to incorporate into template 200. As mentioned above, identifying a content image typically involves a series of user actions including the user clicking on button 202, selecting the appropriate button 401 or 402, and then identifying the desired image. The user might optionally be provided with access to a cropping tool, not shown, allowing the user to manually select a specific portion of the content image to be incorporated into the design. In the illustrative example described herein, at step 1410 the user chooses image 411 for incorporation.

For the purpose of preparing the resized image versions, it is assumed that the typical user desires to see the incorporated images displayed at the largest size possible. Therefore, at step 1420, the largest size at which image 411 can be displayed in image area 201 while maintaining the image 411 aspect ratio and orientation is determined based on the aspect ratio of image 411 and the size and aspect ratio of acceptable image area 201. Optionally, if the operator of server 110 desires to give the user increased control over the image incorporation process, Design Screen 210 could include one or more additional user controls, not shown, to allow the user to request that the incorporated images be arranged in a specific way, such as all images arranged in one vertical column or one horizontal row, regardless of whether the images could be displayed at a larger size in another arrangement.

Figure 5:
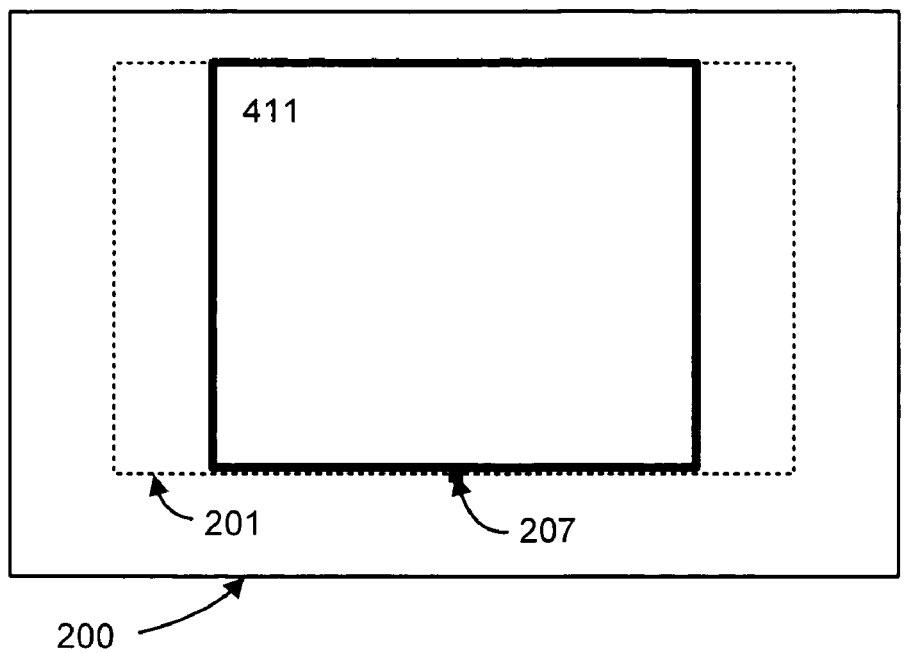
FIGS. 5-13 illustrate image sizing and positioning operations for user-selected images.

At step 1430, a resized version of image 411 is created at the size determined in step 1420 and, at step 1440, template 200 is updated to position the resized image at the position dictated by the selected image area anchor point. In this example, as depicted in FIG. 5, image 411 has been sized at its original aspect ratio to fit within image area 201. The designer of template 200 identified point 217 as being the anchor point for image area 201, therefore image 411 is centered on this point within image area 201. Unless the content image coincidentally happens to have exactly the same aspect ratio as acceptable image area 201, the image will not entirely fill acceptable image area 201.

While the user is not obligated to incorporate more than one content image into image area 201, many users will wish to do so. As discussed below, to facilitate the user's process of quickly and easily creating an attractive design with multiple images, all user-incorporated images are resized such that all of the images will be simultaneously visible to the user in the acceptable image area. In other words, the user-selected content images are sized such that they all fit in the acceptable image area without any user-selected content image obscuring or overlapping any other content image. Further, because it could be visually unattractive or undesirable if the incorporated content images are positioned so as to be touching, the content images are sized to allow for a separation space both horizontally and vertically between all content images.

Figure 6:
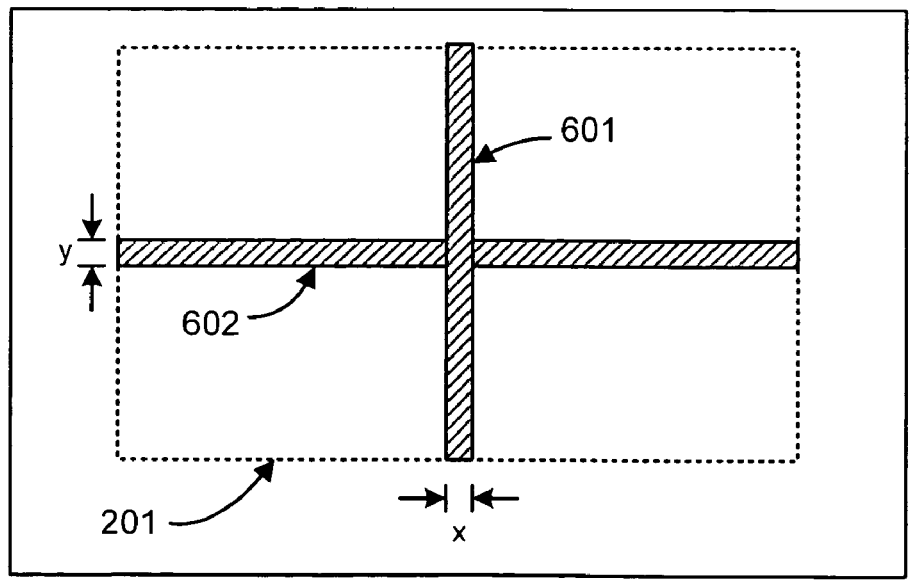

Referring to FIG. 6, shaded areas 601 and 602, having widths x and y respectively, represent the horizontal and vertical spacing that will be maintained between all content images in image area 201 when multiple images are present. The shaded areas are shown in the figures herein for the purposes of explanation and illustration only. No visible spacing elements are displayed to the user while the user is creating the user's custom design. All templates could use the same default horizontal and vertical spacing values or the template designer could be allowed to vary the spacing values in some or all templates.

Steps 1410-1440 are repeated if the user incorporates another content image. When an additional image is added, the image or images previously incorporated are resized as necessary and repositioned within image area 201 to accommodate the newly added image. The manner in which the multiple images are to be arranged within image area 201 is determined as a part of step 1420.

Figure 7:
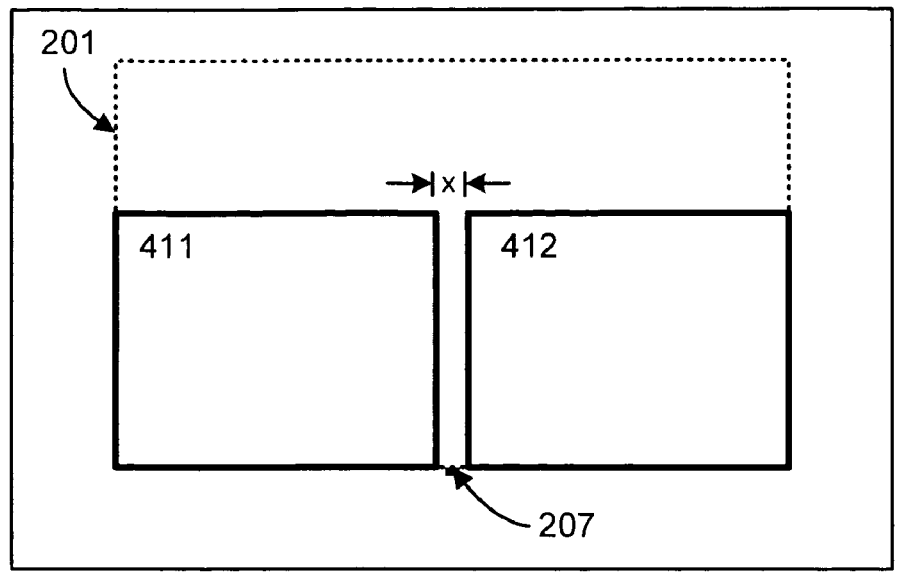
Figure 10:
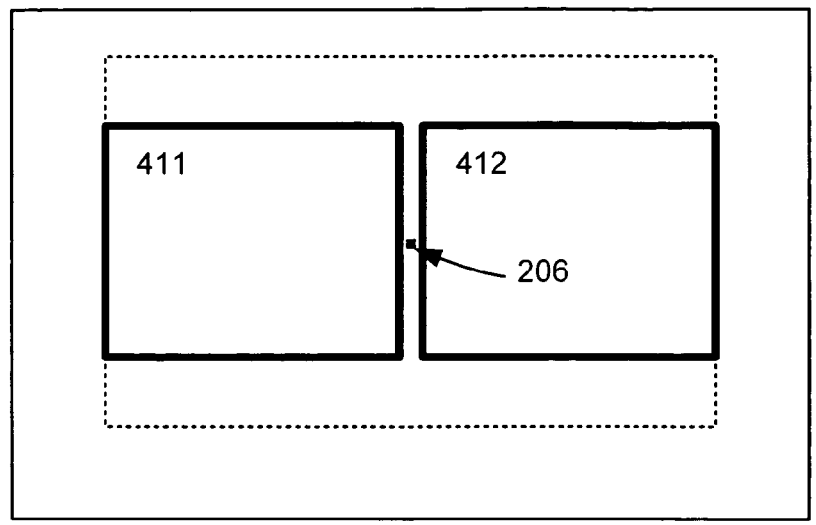

Referring now to the example depicted in FIG. 7, the user has now identified image 412 for incorporation into template 200. As discussed above in connection with FIG. 6, images 411 and 412 are separated by the defined horizontal separation distance x. The positioning of the images within area 201, as shown in FIG. 7, was dictated by the location of the anchor point specified for that image area, in this example anchor point 217. If, for example, the anchor point had been chosen by the designer of template 200 to be anchor point 216 at the center of image area 201, images 411 and 412 would have been positioned within image area 201 as shown in FIG. 10.

In FIG. 7, the manner of displaying images 411 and 412 in image area 201 in the largest size resulting in images 411 and 412 being arranged horizontally in image area 201. It will be appreciated that this is not necessarily the case is all situations. In some cases, different aspect ratios of image area 201 and content images will result in the first and second content images being arranged vertically within available image area 201.

Figure 8:
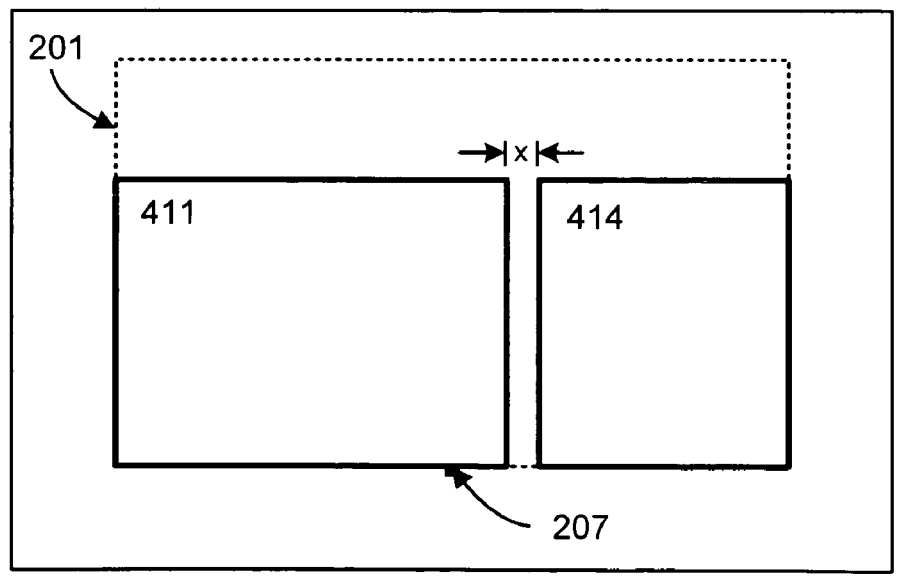

In the example shown in FIG. 7, the user has selected two images having the same aspect ratio. This also may not always be the case and a user could choose to incorporate images with different aspect ratios. One possible technique for handling this situation is shown in FIG. 8. In this example, after selecting image 411, the user selected image 414. The images are sized and positioned such that they fit within acceptable image area 201, maintain the original aspect ratio of each image, and are of equal length in one dimension, vertically in this example. Again, the images are spaced apart by the horizontal spacing distance x. This approach would display both images in their entirety, but would result in a lack of image symmetry and could yield an unattractive or unsuitable design if a number of images of significantly different aspect ratios are incorporated into the same image area.

Figure 9:
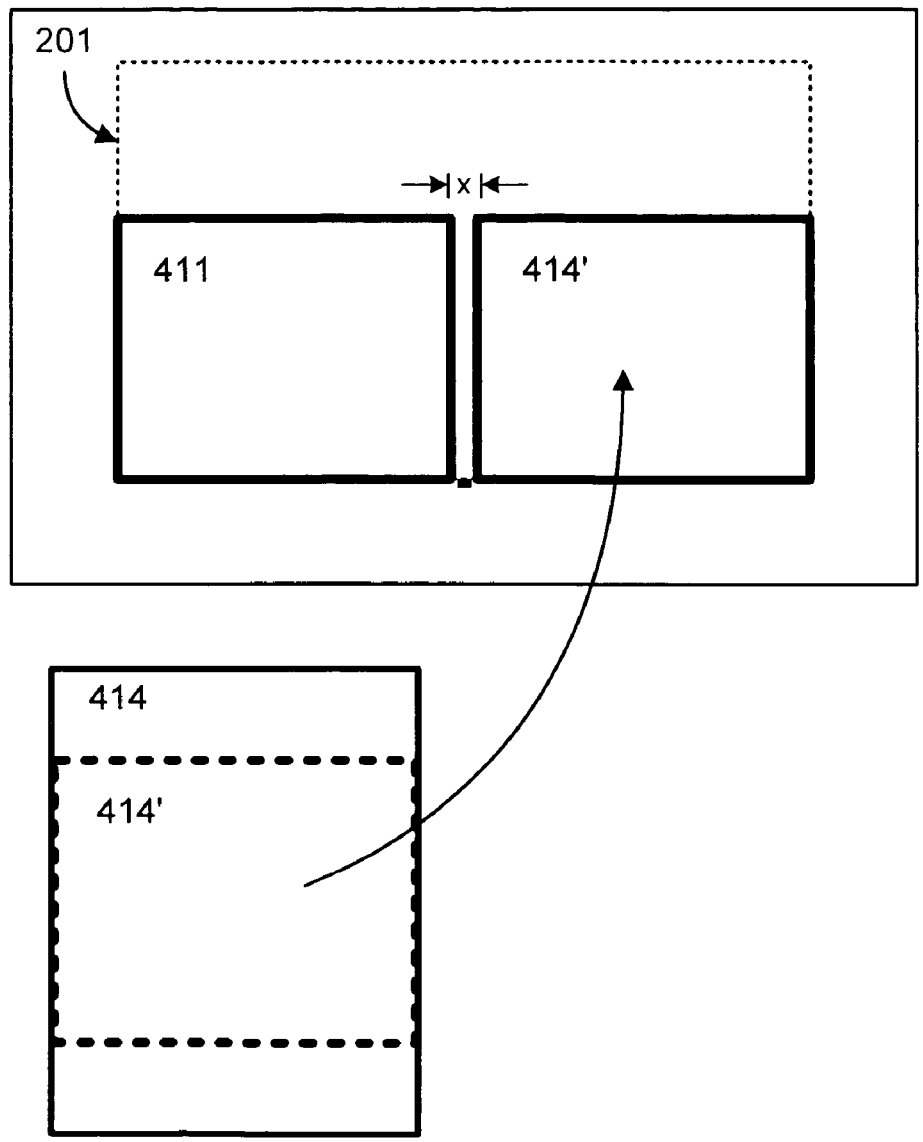

FIG. 9 depicts the method of incorporating images of differing aspect ratios employed in the embodiment discussed herein. In this technique, all content images in image area 201 are displayed at the same size and at the aspect ratio of the first image identified by the user. Any subsequently incorporated images that do not have the same aspect ratio as the first identified image are cropped to create a version with the aspect ratio of the first image. For example, as shown in FIG. 9, if the user first selected image 411 and then selected image 414, a cropped version of image 414, indicated in FIG. 9 as 414', is created and resized as a part of step 1830. This technique crops out some image content from the outer portion of the image, but results in a more symmetrical and easily scalable array of images displayed in image area 201.

Figure 11A:
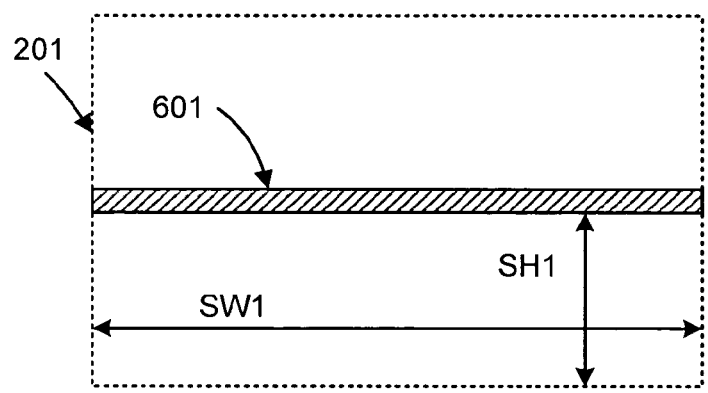
Figure 11B:
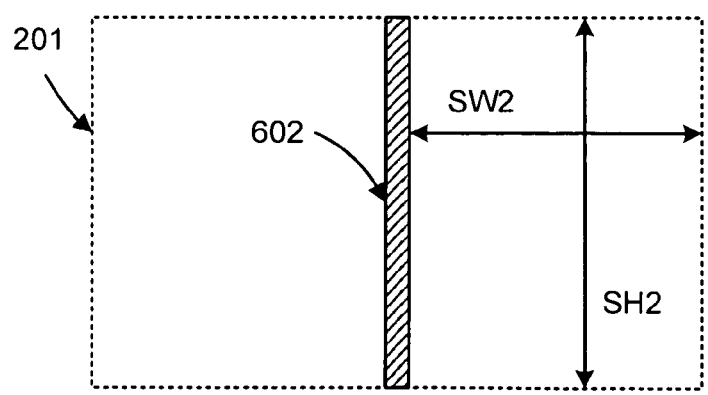

When two or more images are to be sized and positioned in image area 201, the image arrangement that will display the images in the largest size is identified. In the disclosed embodiment, this is accomplished by testing the possible arrangements and selecting the arrangement that allows the largest image size. Referring to FIGS. 11A and 11B, in the case of two content images, image area 201 can conceptually be divided by minimum vertical spacing 601 into two equal segments having segment height (SH) 1 and segment width (SW) 1 or by minimum horizontal spacing 602 into two equal segments having SH2 and SW2. In this example, from the aspect ratio of image 411 and the aspect ratios of the segments shown in FIGS. 11A and 11B, it can be determined that images 411 and 412 can be displayed at a larger size in the arrangement of FIG. 11B, as shown in FIG. 7.

Figure 11C:
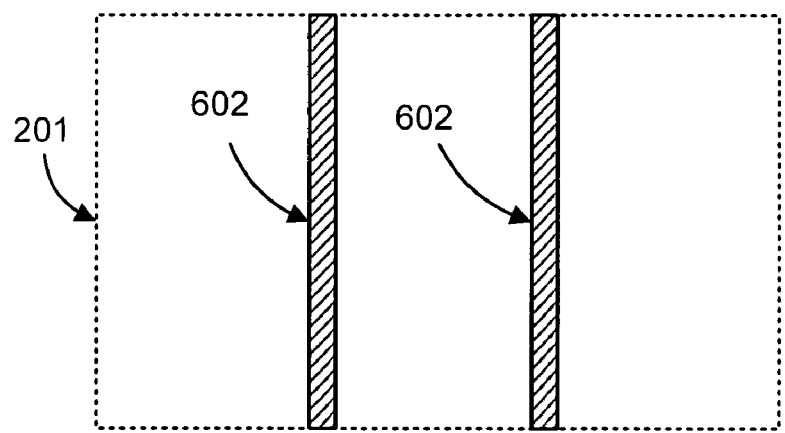
Figure 11D:
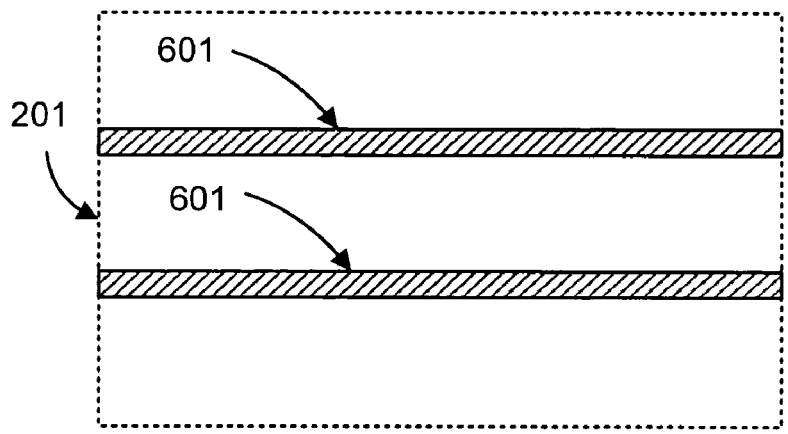
Figure 11E:
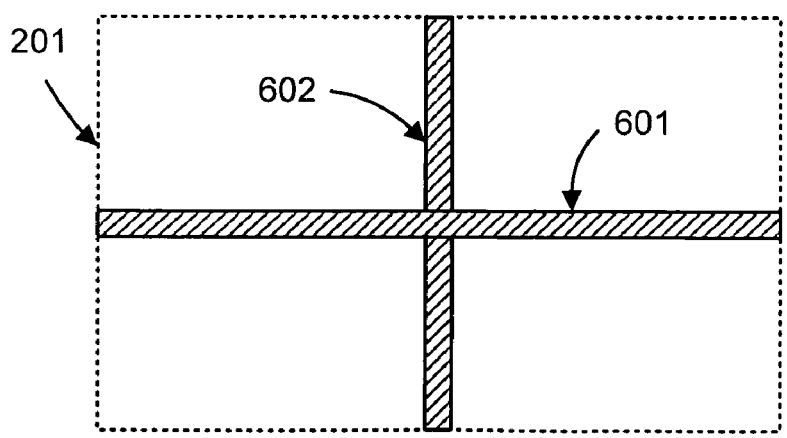
Figure 12:
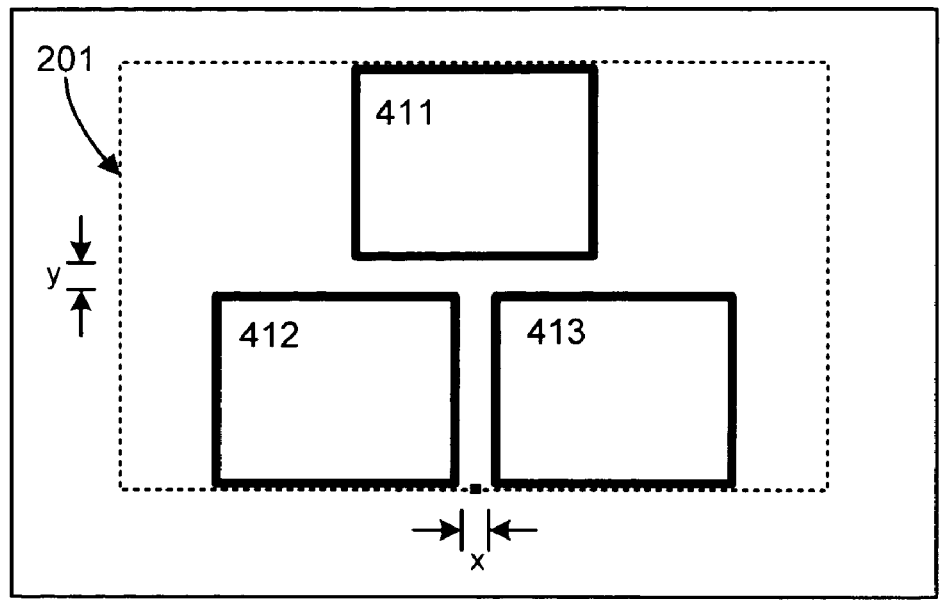

A similar process is performed for any number of content images identified by the user. For example, in the case of three content images, image area 201 can be divided for image size testing purposes into segments as indicated in FIGS. 11C-11E. In the example of the user adding content image 413 to images 411 and 412, testing the possible image size in each of the three types of available image portions of FIGS. 11C-11E indicates that these three images can be displayed in the largest size in a two dimensional arrangement, such as shown in FIG. 11E. As indicated in FIG. 12, the actual positioning of the images within image area 201 is dictated by the location of the designated anchor point. Image 411 is separated from images 412 and 413 by vertical spacing distance y and image 412 is separated from image 413 by horizontal spacing distance x. If the user incorporates a sufficiently large number of images, acceptable image area 201 could contain more than two rows of images.

Figure 13:
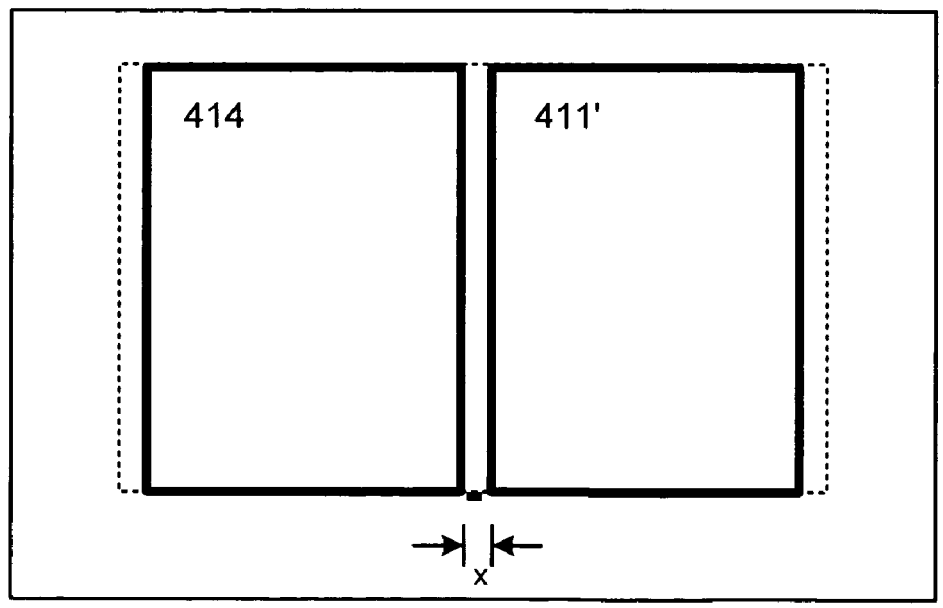

Similar processing would be performed if the first image selected had been an image having a vertical format, such as image 414. As depicted in FIG. 13, if the first image added by the user had been image 414 and then the user selected image 411, the aspect ratio of image 414 would be used for all subsequently identified images and image 411 would have been cropped to create a cropped version 411' having the aspect ratio of image 414.

Additional user guides or aids to assist the user in creating a pleasing design may be employed, if desired. For example, if a user selected a template having a horizontal image area, such as template 200, and then initially added an image having a vertical format, such as image 404 (or vice-versa), instead of immediately inserting the user's selected image into the image area, design tools 106 could be implemented to detect that the aspect ratio of the image and the aspect ratio of the image area are different and automatically react by performing special actions. For example, the user could be presented with one or more alternate templates having image areas of the same type of aspect ratio as the selected image or the user could be presented with an alert message suggesting that other templates might be better suited for the selected image.

The foregoing discussion described an illustrative process for dynamically sizing and positioning multiple content images in an acceptable image area of a template. Referring now to FIGS. 15-21, an illustrative process will be discussed for adding frame images to the content images prior to performing the sizing and positioning operations.

Figure 15A:
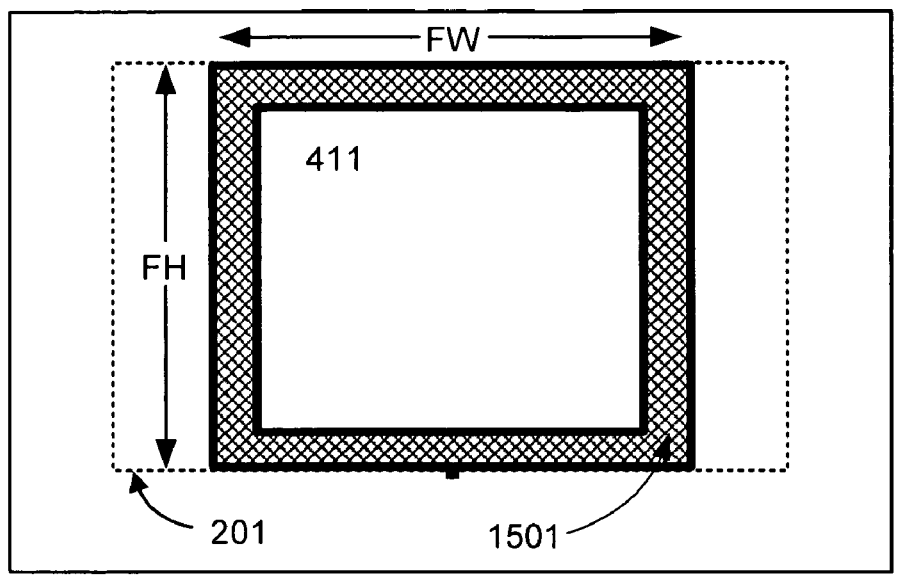
FIGS. 15-19 illustrate image framing, sizing and positioning operations for user-selected images.
Figure 15B:
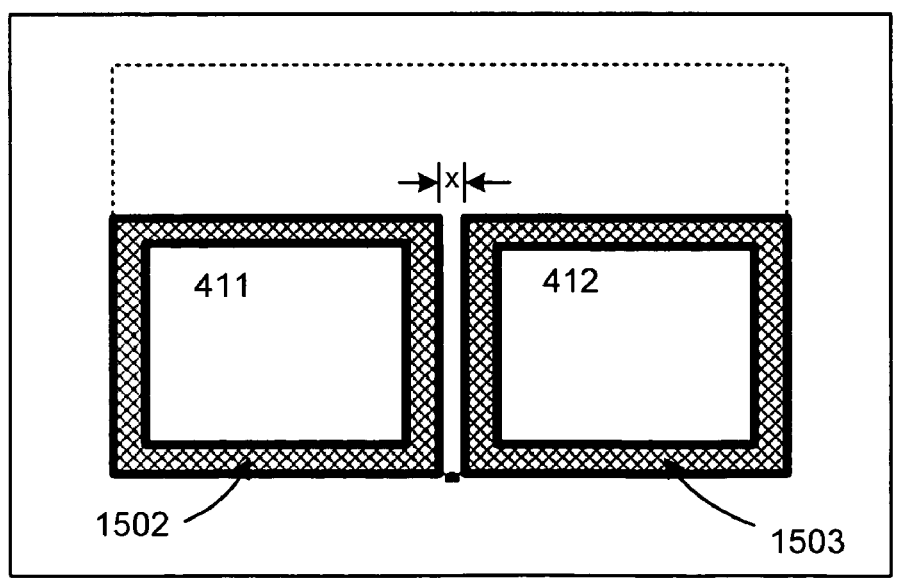
Figure 16:
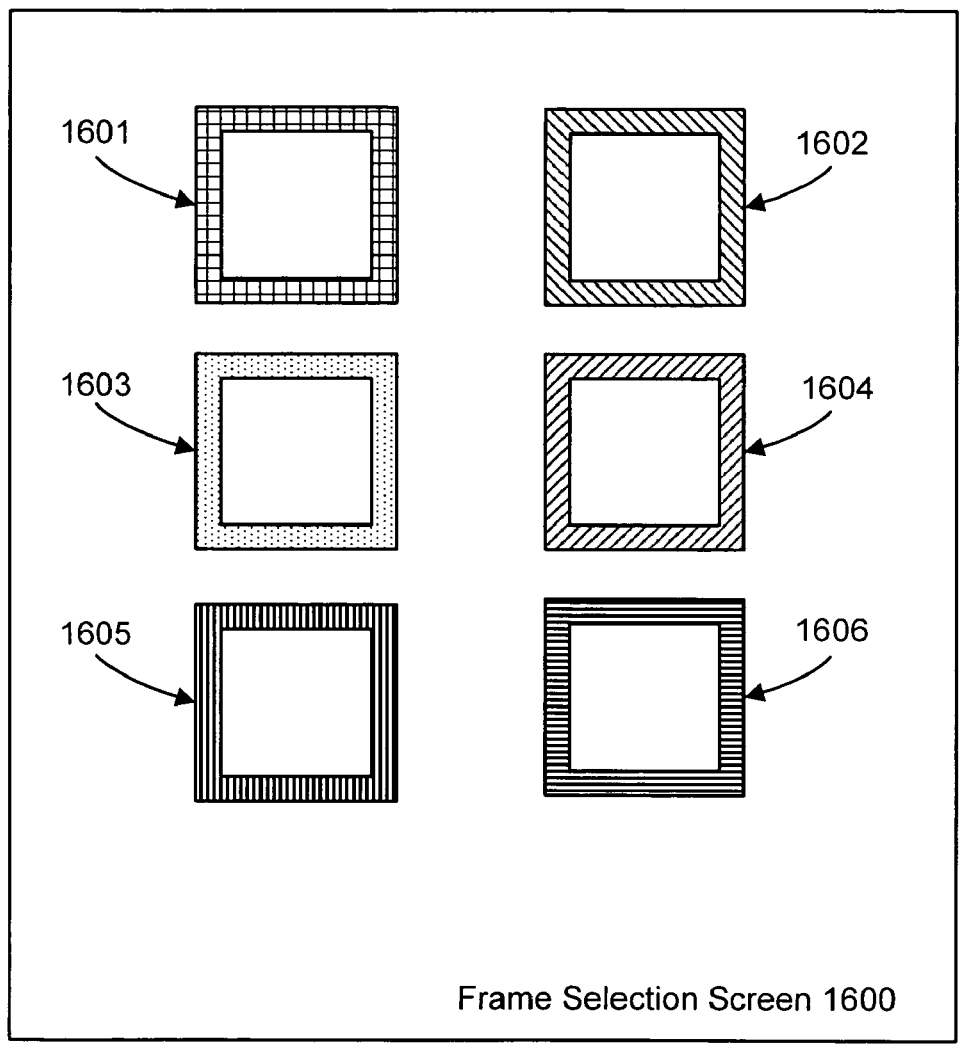

FIG. 15A is similar to FIG. 5 except that in FIG. 15A image 411 is rendered at a slightly smaller size than was the case in FIG. 5 and is presented to the user inside of a frame image 1501. The frame image could be a default design selected by the template 200 designer as being complementary to the overall template 200 design and downloaded to UCS 100 along with template 200, or could have been selected by the user from a selection of optional frame designs displayed to the user on one or more frame selection screens, such as frame selection screen 1600 depicted in FIG. 16, showing various available frame colors, patterns or other frame choices 1601-1606 available for use with the template.

Figure 21:
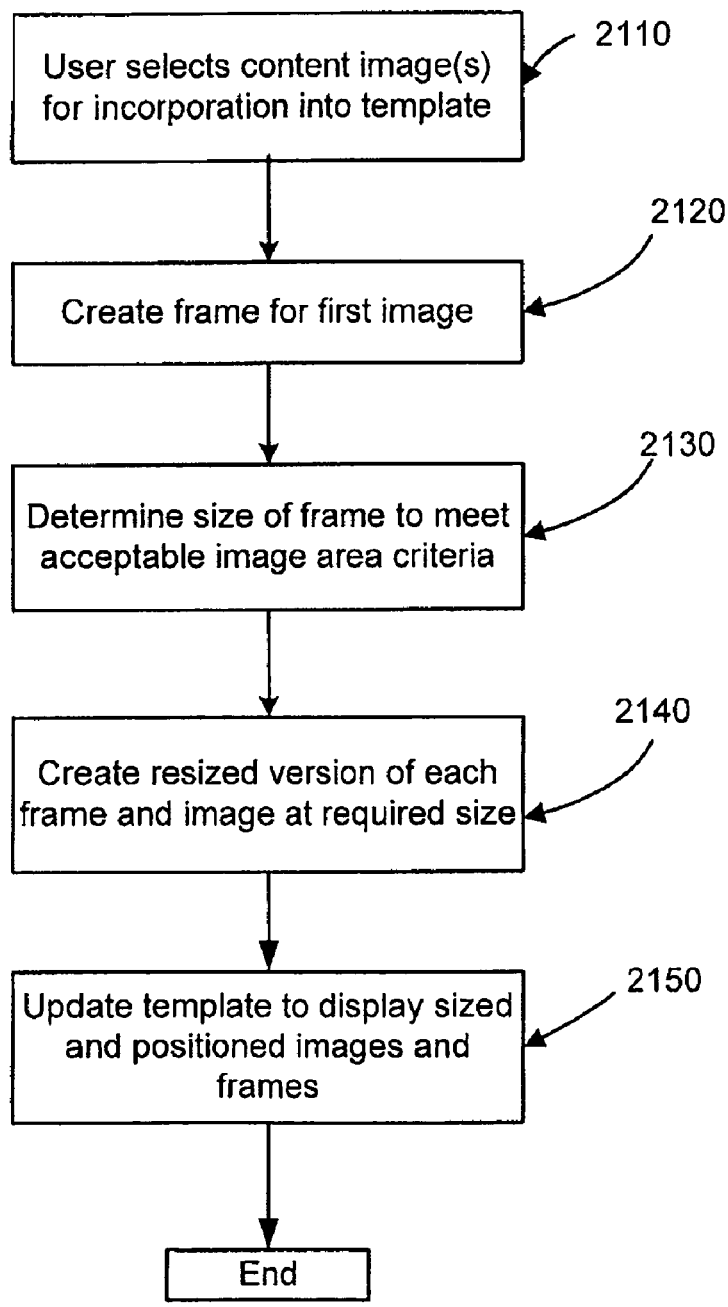
FIG. 21 is a flow chart of an illustrative image incorporation and framing process.

Referring to FIG. 21, a representative process for creating and positioning framed content images in image area 201 will be discussed. At step 2110, the user identifies one or more content images for incorporation into template 200. At step 2120, as will be discussed in greater detail below, a frame is dynamically created to fit the first content image. Because, as mentioned above, all content images will be cropped as necessary to create image versions having the aspect ratio of the first identified image, the same frame image can be employed for all subsequently identified content images.

It can be appreciated that the frame will typically have a different aspect ratio than the content image. For example, if a frame ½ inch wide were to be added around an image that is 6 inches wide by 4 inches high, the aspect ratio of the resulting 7-inch by 5-inch frame would be 7:5 whereas the aspect ratio of the image is 6:4. Because the image, including the frame, must fit in image area 201, it is the aspect ratio of the frame, not that of the content image, that is used to determine image sizing and positioning for image are 201. At step 2130, the size of the frame that meets the basic criteria of displaying the frame at the largest possible size while maintaining the frame aspect ratio and fitting within image area 201 is determined. At step 2140 the frame and the image are resized to the size determined in step 2130 and, at step 2150, the template displayed to the user is updated to display the framed image at the appropriate location as determined by the selected anchor point.

If the user has identified multiple content images, step 2130 includes testing the various possible segments of image area 201, following a similar process to that described above in connection with FIGS. 11A-E, to determine the largest size at which the framed images can be displayed while meeting the other constraints. In the example depicted in FIG. 15B of a user selecting images 411 and 412, the resulting image area 201 will contain images 411 and 412 displayed within frames 1502 and 1503.

Figure 17A:
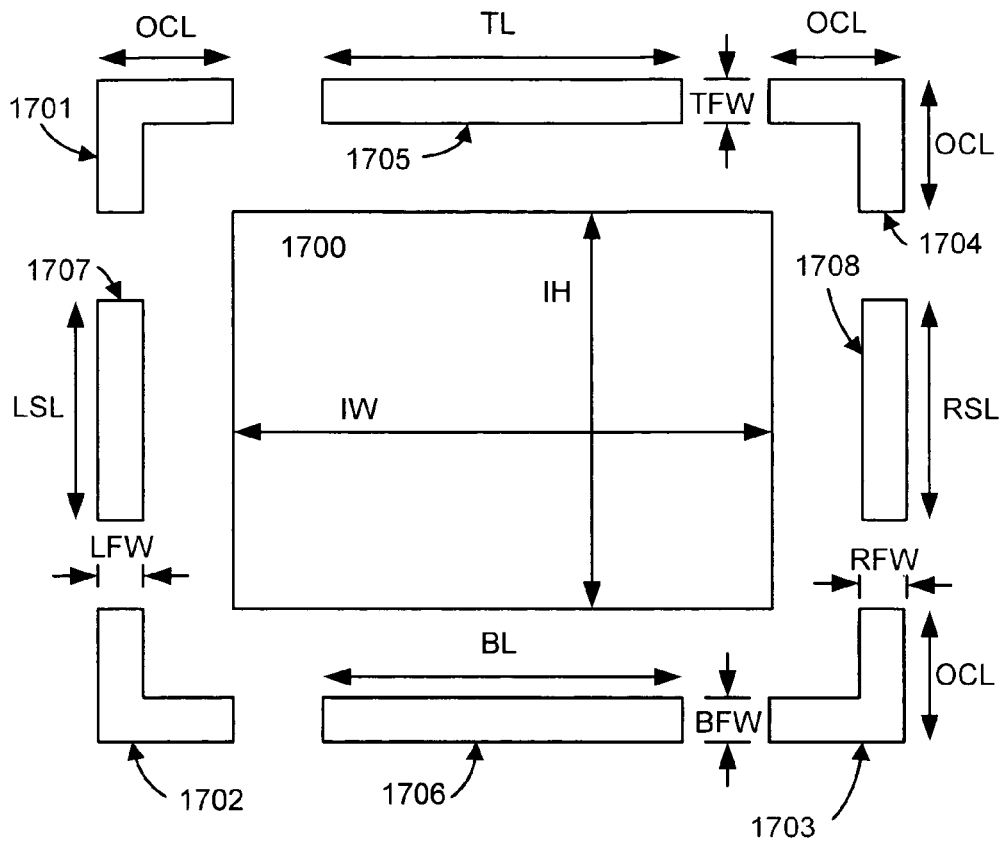
Figure 17B:
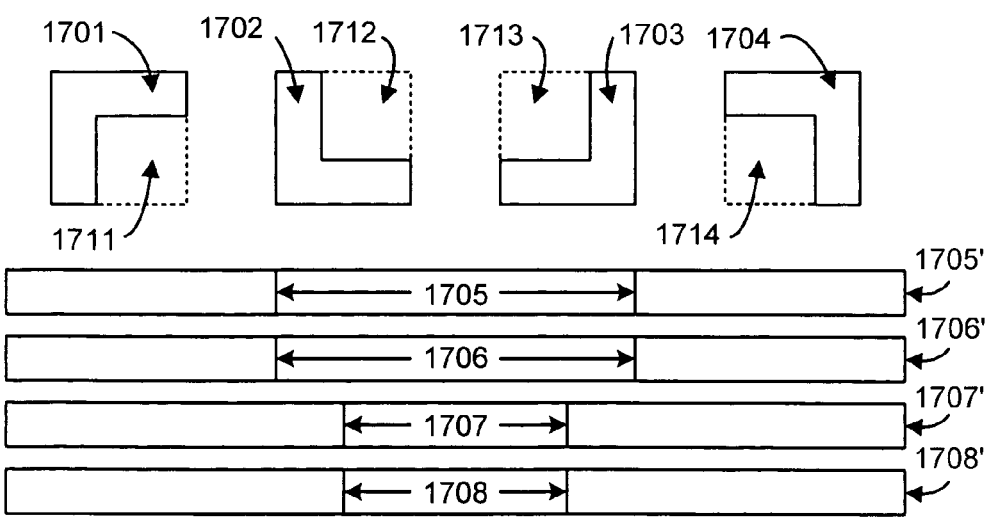

Turning now to FIGS. 17A and 17B, the structure of a dynamically assembled image frame will be discussed. Image 1700 represents a generic image having image height IH and image width IW. In the described embodiment, each frame image, such as frame 1501 in FIG. 15, is a composite image assembled using four corner images, such as corner images 1701-1704 and four edge images, such as edge images 1705-1708. In this example, each corner image of the frame has outside corner lengths OCL. The edge widths identified as top frame width TFW, bottom frame width BFW, left frame width LFW and right frame width RFW can each be specified independently.

Referring to FIG. 17B, the four square corner images have portions 1701-1704 that are visible to the user and portions 1711-1714 that are transparent. The portion of the content image that is underneath the transparent portions of the corners remains visible. The four edge pieces 1705-1708 are portions of top, bottom, left and right master edge pieces 1705'-1708' that have been cropped to the appropriate length (top length TL, bottom length BL, left side length LSL, and right side length RSL, respectively, as indicated in FIG. 17A) to complete the frame. Master edges 1705'-1708' were prepared by the frame designer to be at least as long as the longest possible edge of any image area 201 in any template with which the frame might be used. Because the frame designer may have positioned decorative elements in the center of the master edges that the designer desires to appear in the middle of the edge of the cropped frame, the portions of the master edge images to be used in the frame are taken from the center of the master images so that centrally-located design elements, if any, of the edges appear in the center of the cropped versions. In addition, because some of the frames may have been designed with content having a specific directional orientation, for example a frame design having blue sky at the top and grass at the bottom, each of the four corner images and each of the four side images is assigned a specific position and orientation in the overall frame design and are assembled accordingly.

To control the size relationship between the corner pieces and the edge pieces, the frame designer will specify frame constraints that establish the minimum portion of each side of the frame that must consist of edge image. For example, the designer could specify that at least 50% of each side of the frame image displayed to the user must be an edge piece image. In the example depicted in FIG. 17A, the 50% constraint would mean that the length of LSL must equal or greater in length to OCL+OCL. To provide the frame designer with design freedom in designing corner and edge images, a different edge percentage constraint could be established for each of the four sides of the frame.

Based on the frame side constraints, the aspect ratio of the content image, and the size of the corner images, the frame image will be created such that each side at least meets the minimum frame side constraint for that side. For example, referring to FIG. 17A, if the designer had set the minimum edge image percentage as 50% for all four frame sides, the frame image is created by cropping sections of master images 1707' and 1708' that are equal to the combined lengths of the two corner images, such that the length of LSL and RSL is 50% of the total side frame length. For the top and bottom frame sides, the edge pieces 1705 and 1706 are cropped to the appropriate length to complete the frame at the proper aspect ratio to fit the content image. Once the initial frame image is created, it is resized along with the associated content image such that the size of the frame relative to the content image remains the same as additional content images are added and resized in acceptable image area 201.

Figure 18A:
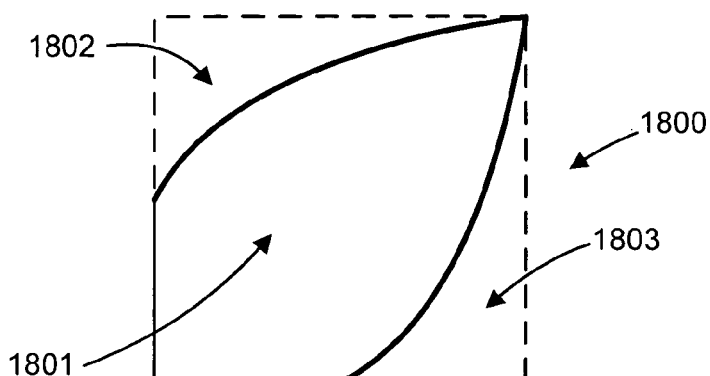
Figure 18B:
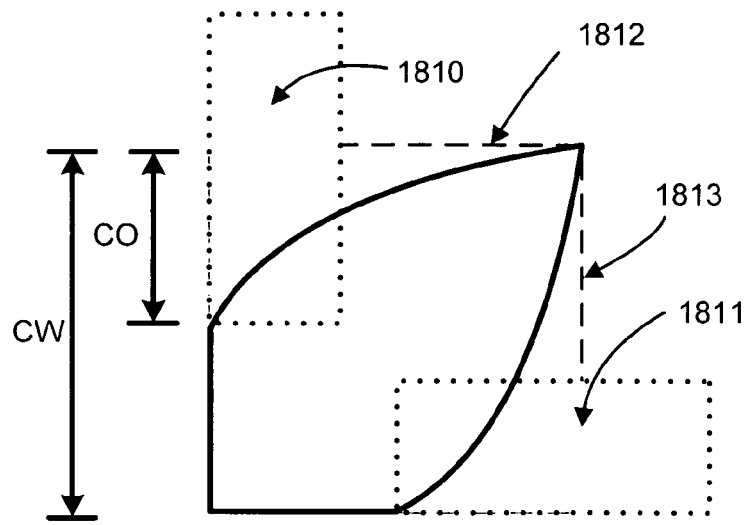
Figure 18C:
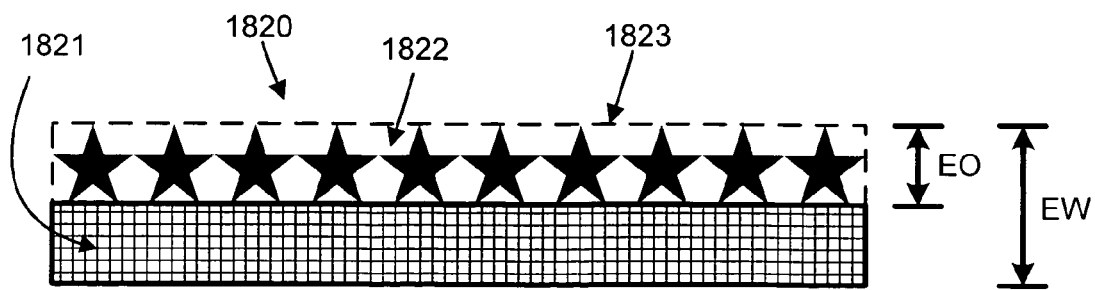

The frame designer may choose to provide frames having more complex corner and edge images. To ensure that frames using these more complex images appear properly, it may be necessary that additional adjustments be used in creating the frame image. By way of illustration, FIG. 18A depicts corner image 1800 containing an arrowhead shaped element 1801. Sections 1802 and 1803 of image 1800 are transparent. Referring to FIG. 18B, it can be seen that, if edge images 1810 and 1811 were cropped only to the edges 1812 and 1813 of the corner image, the edge images would not touch the visible portion 1801 of the corner image, resulting in an unsatisfactory frame appearance. To ensure that no undesired transparent space remains in the assembled frame, edge images 1810 and 1811 need to extend under the corner image, as indicated in FIG. 18B. To properly position the component images for any necessary overlap, the z-indices of the frame elements are set such that the frame edge images are positioned over the content image and the frame corner images are positioned over the edge images. This extended length of the edge piece, indicated by corner overlap CO, can be specified by the frame designer as a percentage of the corner width CW. The extra length added to the edge image for overlap purposes is not considered for the purpose of the minimum edge image proportion determinations discussed above.

Similarly, the designer could choose to provide transparent areas in the edge images. For example, referring to FIG. 18C, edge image 1820 could be created by the designer to have an outside portion 1821 that is solid with no transparency and an inner portion 1822 that has visible elements, but also has transparent areas around the visible elements such that the content image underneath can be seen. For this type of edge image, because of the transparent regions of portion 1822, the designer wants the frame to be positioned relative to the content image such that the content image extends to portion 1821 and not to stop at inner edge 1823. This extension of the content image, indicated in FIG. 18C by edge image overlap EO, is specified by the frame designer as a percentage of the edge width EW. Each edge of the frame can be assigned a different edge image overlap percentage, therefore some, all or none of the edge images may overlap the content image.

Figure 19:
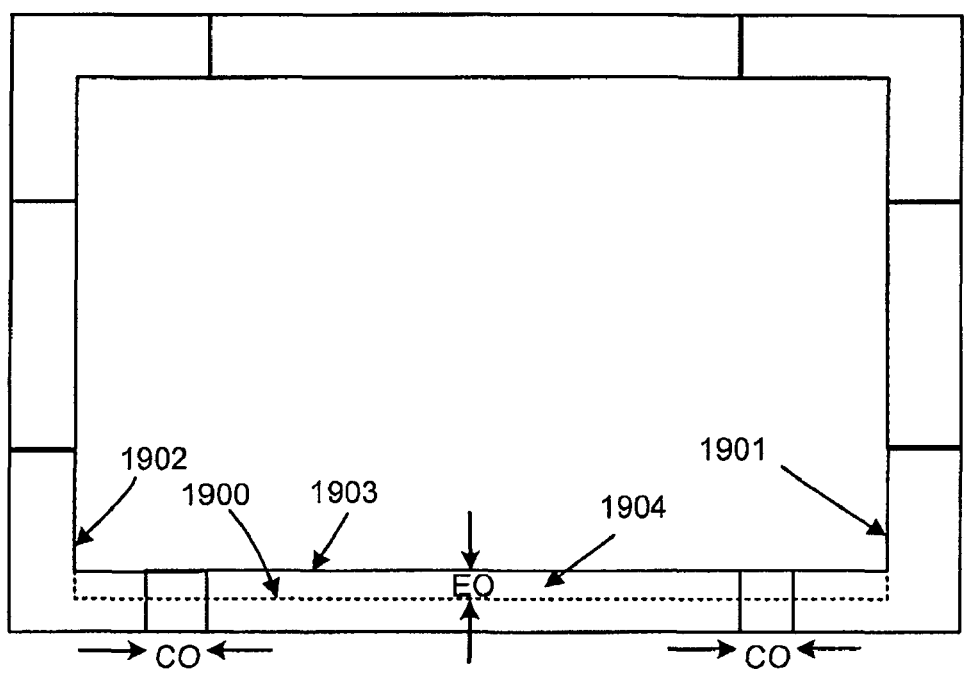

Referring to FIG. 19, an example of a simple frame image with corner and edge overlaps is depicted for illustration. The frame designer has specified that corner images 1901 and 1902 overlap edge image 1903 by a percentage of the corner width that will yield the necessary overlap area. Edge image 1903 was, therefore, cropped to include the extra length, CO, on both ends which will be overlapped by the corner images. In addition, the designer has prepared edge image 1903 with a portion 1904 having transparency, therefore the frame image is created such that edge 1903 overlaps the lower edge of the image, which is indicated by dotted line 1900, by the proportional amount shown as EO.

Figure 20:
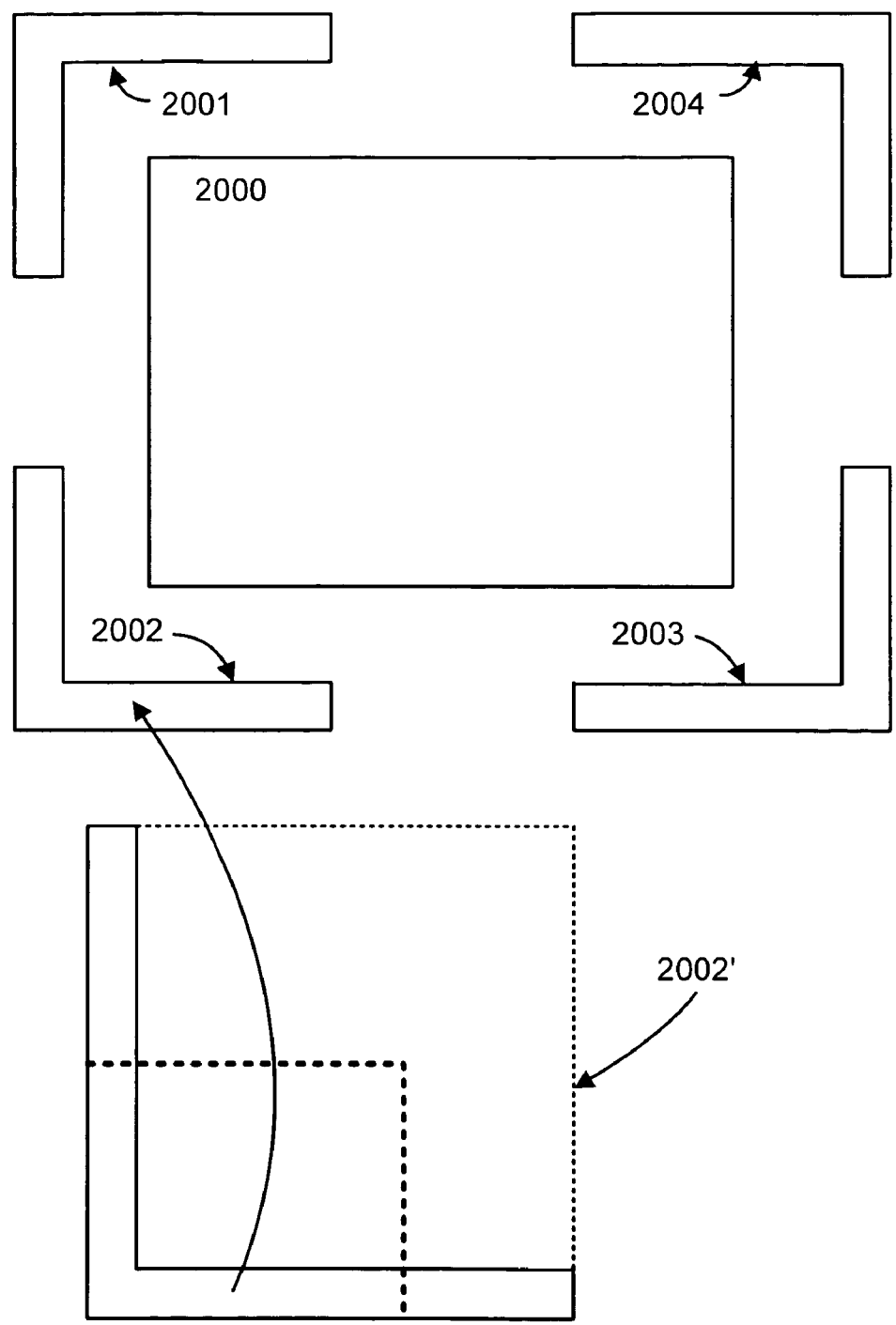
FIG. 20 illustrates an alternative framing process.

While various illustrative embodiments have been discussed, alternate embodiments could also be employed. Constructing frames with eight component elements provides significant creative freedom to the designers to create a wide range of attractive and varied frame elements, however, it will be understood that a different number of frame elements could be employed. For example, instead of implementing the frame as an assembly of four corner images and four cropped edge images, as shown in FIGS. 17-19, the frame could be assembled using only four corner images, such as shown in FIG. 20 The designer would create four master corner images, such as representative master corner image 2002', having vertical and horizontal sides of sufficient length to create frames for the range of templates offered by the operator of server 110. When the required frame size for image 2000 is determined, corner images 2001-2004 are cropped to the required size, such as representative cropped corner image 2002 created from master corner image 2002'.

Figure 22A:
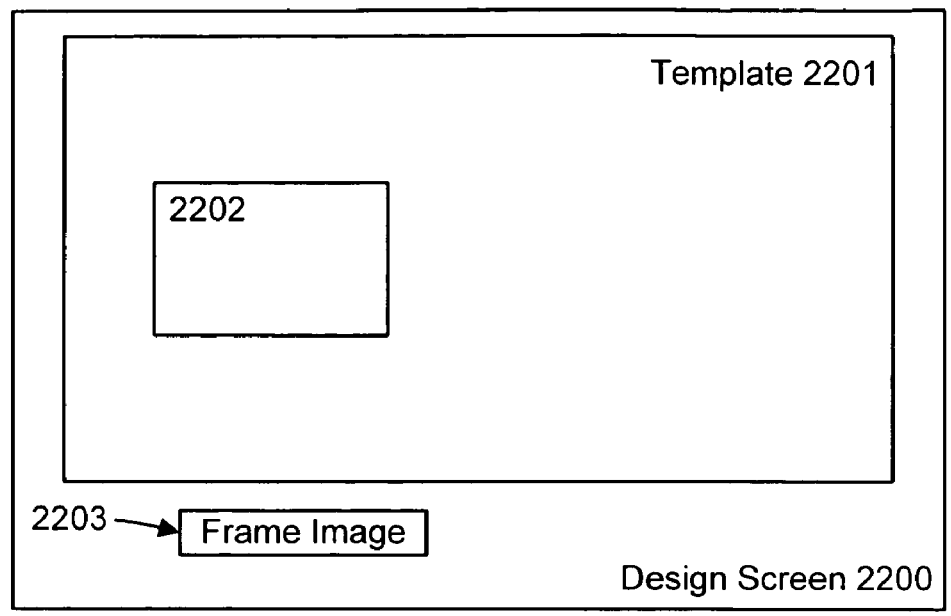
FIGS. 22A and 22B illustrate an alternative framing embodiment.
Figure 22B:
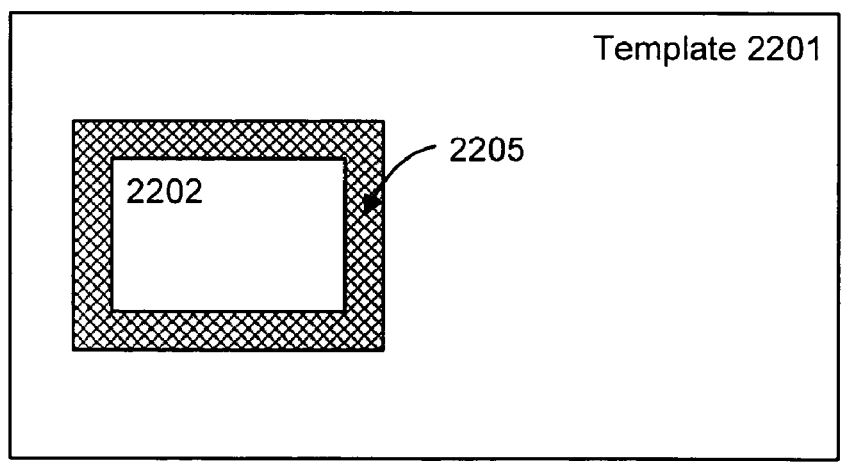

As another alternate embodiment, it can be appreciated that the process for automatically generating a frame is not limited to use with templates having a predefined image area 201. The frame generation process could be readily adapted to automatically generate a frame around any image. As one example, FIG. 22A depicts a design screen 2200 received from server 110 and displayed to the user on display 140. Product template 2201 is being customized by the user. Template 2201 does not have a predetermined allowable image area, but instead allows the user to position content images, such as image 2202, as desired by the user in template 2001. Design screen 2200 provides frame generation button Frame Image 2203, allowing the user to request that a frame image 2205 be generated and displayed around image 2202 wherever the user has placed image 2202 in the design.

The described embodiments are, therefore, to be considered as illustrative rather than restrictive and the scope of the invention is as indicated in the following claims and all equivalent methods and systems.

What is claimed is:

1. A computer-implemented method for dynamically creating and positioning a framed content image in an image area on a design screen of a browser display window, the method comprising the steps of:
    obtaining a content image for incorporation into the image area on the design screen;
    obtaining one or more master frame component images;
    automatically cropping, by a processor, at least one of the master frame component images to create a plurality of frame component images which are assemblable into a frame that fits the content image without altering the aspect ratio of the content image, the plurality of frame component images including at least a plurality of cropped versions of the master frame component images, the plurality of frame component images further comprising four corner component images and zero or more edge component images;
    automatically assembling, by a processor, at least the plurality of frame component images into a frame having a corresponding frame aspect ratio such that the frame appears as a frame image for the content image when the frame component images and content image are displayed together;
    determining a largest possible frame size of the frame such that the frame aspect ratio is maintained and fits within the image area;
    sizing the frame and the content image such that the frame is sized to the determined largest possible frame size;
    and positioning the sized frame and content image within the image area such that the sized frame appears as a frame image for the content image when the frame component images and content image are displayed together.

2. The method of claim 1, wherein the one or more master frame component images comprises four master corner component images and four master edge component images, the cropping step comprising:
    obtaining a minimum frame side constraint, the minimum frame side constraint specifying a minimum portion of a side of the frame that must comprise an edge component image, and
    cropping at least two of either the master corner component images or the master edge component images, or at least two of each of the master corner component images and the master edge component images, such that when the plurality of frame component images are assembled into the frame, each side of the frame meets the minimum frame side constraint.

3. The method of claim 1 wherein, if one or more frame component images contain one or more areas of visible content and one or more areas of transparency, the frame component images are created and assembled such that the visible content of one or more of the component images overlap the visible content of one or more other component images such that the areas of visible content in the component images will form a complete frame image when the composite images are displayed together.

4. The method of claim 1 wherein, if one or more frame component images contain one or more areas of visible content and one or more areas of transparency, the frame component images are created and assembled over the content image such that at least some of the areas of component image transparency overlap at least a portion of the content image.

5. The method of claim 1, wherein the plurality of frame component images comprises four corner component images, at least two of the four corner component images created by cropping at least one master corner component image.

6. The method of claim 5, the at least one master corner component image comprising four master corner component images each assigned a corresponding location and orientation in a frame design.

7. The method of claim 1, wherein the plurality of frame component images comprise four corner component images and four edge component images, and wherein at least two of the four corner component images are created by cropping at least one master corner component image or at least two of the four edge component images are created by cropping at least one master edge component image.

8. The method of claim 1, wherein the one or more master frame component images comprises at least one master corner component image and at least one master edge component image, the at least one master edge component image comprising two ends and a center, wherein automatically cropped versions of the at least one master edge component image are cropped equally from both ends such that the center appears as the center of the cropped version of the at least one master component image.

9. The method of claim 1, wherein the one or more master frame component images comprises at least one master corner component image and at least one master edge component image, the at least one master corner component image comprising four master corner component images each assigned a location and orientation in a frame design, and the at least one master edge component image comprising four master edge component images each assigned a location and orientation in a frame design.

10. The method of claim 1, wherein the plurality of frame component images comprises four edge component images and the four edge component images are positioned such that only one edge component image is between and adjacent to any two corner component images.

11. A non-transitory computer-readable memory having computer-executable instructions, which when executed by one or more processors, perform a method for dynamically creating and positioning a framed content image in an image area on a design screen of a browser display window, the method comprising the steps of:
    obtaining a content image for incorporation into the image area on the design screen;
    obtaining one or more master frame component images;
    automatically cropping, by a processor, at least one of the master frame component images to create a plurality of frame component images which are assemblable into a frame that fits the content image without altering the aspect ratio of the content image, the plurality of frame component images including at least a plurality of cropped versions of the master frame component images, the plurality of frame component images further comprising four corner component images and zero or more edge component images;

automatically assembling, by a processor, at least the plurality of frame component images into a frame having a corresponding frame aspect ratio such that the frame appears as a frame image for the content image when the frame component images and content image are displayed together;

determining a largest possible frame size of the frame such that the frame aspect ratio is maintained and fits within the image area;

sizing the frame and the content image such that the frame is sized to the determined largest possible frame size;

and positioning the sized frame and content image within the image area such that the sized frame appears as a frame image for the content image when the frame component images and content image are displayed together.

12. The non-transitory computer-readable memory of claim 11, wherein the one or more master frame component images comprises four master corner component images and four master edge component images, wherein the cropping instructions include instructions for:

obtaining a minimum frame side constraint, the minimum frame side constraint specifying a minimum portion of a side of the frame that must comprise an edge component image, and cropping at least two of either the master corner component images or the master edge component images, or at least two of each of the master corner component images and the master edge component images, such that when the plurality of frame component images are assembled into the frame, each side of the frame meets the minimum frame side constraint.

13. The non-transitory computer-readable memory of claim 11 wherein the instructions include instructions to, if one or more frame component images contain one or more areas of visible content and one or more areas of transparency, cause the frame component images to be created and assembled such that the visible content of one or more of the component images overlap the visible content of one or more other component images such that the areas of visible content in the component images will form a complete frame image when the composite images are displayed together.

14. The non-transitory computer-readable memory of claim 11 wherein the instructions include instructions to, if one or more frame component images contain one or more areas of visible content and one or more areas of transparency, cause frame component images to be created and assembled over the content image such that at least some of the areas of component image transparency overlap at least a portion of the content image.

15. The non-transitory computer-readable memory of claim 11 wherein the plurality of frame component images comprises four corner component images, at least two of the four corner component images created by cropping at least one master corner component image.

16. The non-transitory computer-readable memory of claim 15, the at least one master corner component image comprising four master corner component images each assigned a corresponding location and orientation in a frame design.

17. The non-transitory computer-readable memory of claim 11, wherein the plurality of frame component images comprise four corner component images and four edge component images, and wherein at least two of the four corner component images are created by cropping at least one master corner component image or at least two of the four edge component images are created by cropping at least one master edge component image.

18. The non-transitory computer-readable memory of claim 11, wherein the one or more master frame component images comprises at least one master corner component image and at least one master edge component image, the at least one master edge component image comprising two ends and a center, wherein automatically cropped versions of the at least one master edge component image are cropped equally from both ends such that the center appears as the center of the cropped version of the at least one master component image.

19. The non-transitory computer-readable memory of claim 11, wherein the one or more master frame component images comprises at least one master corner component image and at least one master edge component image, the at least one master corner component image comprising four master corner component images each assigned a location and orientation in a frame design, and the at least one master edge component image comprising four master edge component images each assigned a location and orientation in a frame design.

20. The non-transitory computer-readable memory of claim 11, wherein the plurality of frame component images comprises four edge component images and the four edge component images are positioned such that only one edge component image is between and adjacent to any two corner component images.

21. An apparatus for dynamically creating and positioning a framed content image in an image area on a design screen of a browser display window, the apparatus comprising:

electronic storage configured to retain one or more master frame component images; and at least one processor configured to obtain a content image for incorporation into the image area on the design screen, automatically crop at least one of the master frame component images to create a plurality of frame component images which are assemblable into a frame that fits the content image without altering the aspect ratio of the content image, the plurality of frame component images including at least a plurality of cropped versions of the master frame component images, the plurality of frame component images further comprising four corner component images and zero or more edge component images, and the at least one processor further configured to automatically assemble at least the plurality of frame component images into a frame having a corresponding frame aspect ratio such that the frame appears as a frame image for the content image when the frame component images and content image are displayed together, determine a largest possible frame size of the frame such that the frame aspect ratio is maintained and fits within the image area, size the frame and the content image such that the frame is sized to the determined largest possible frame size, and position the sized frame and content image within the image area such that the sized frame appears as a frame image for the content image when the frame component images and content image are displayed together.

22. The apparatus of claim 21, wherein the one or more master frame component images comprises four master corner component images and four master edge component images, the at least one processor configured to obtain a minimum frame side constraint, the minimum frame side constraint specifying a minimum portion of a side of the frame that must comprise an edge component image, and the at least one processor configured to crop at least two of the master corner component images or the master edge component images such that when the plurality of frame component images are assembled into the frame, each side of the frame meets the minimum frame side constraint.

23. The apparatus of claim 21 wherein, if one or more frame component images contain one or more areas of visible content and one or more areas of transparency, the at least one processor creates and assembles the frame component images such that the visible content of one or more of the component images overlap the visible content of one or more other component images such that the areas of visible content in the component images will form a complete frame image when the composite images are displayed together.

24. The apparatus of claim 21 wherein, if one or more frame component images contain one or more areas of visible content and one or more areas of transparency, the at least one processor creates and assembles the frame component images over the content image such that at least some of the areas of component image transparency overlap at least a portion of the content image.

25. The apparatus of claim 21, wherein the one or more master frame component images comprises at least one master corner component image and at least one master edge component image, the at least one master edge component image comprising two ends and a center, wherein the at least one processor is configured to automatically crop at least one master edge component image equally from both ends such that the center appears as the center of the corresponding cropped version of the at least one master component image.

26. The apparatus of claim 21, wherein the one or more master frame component images comprises at least one master corner component image and at least one master edge component image, the four master corner component images each assigned a location and orientation in a frame design, and the four master edge component images each assigned a location and orientation in a frame design.

27. The apparatus of claim 21, wherein the plurality of frame component images comprises four edge component images and the four edge component images are positioned such that only one edge component image is between and adjacent to any two corner component images.

* * * * *